US00RE38927E

(19) United States
(12) Reissued Patent
Martwick

(10) Patent Number: US RE38,927 E
(45) Date of Reissued Patent: *Dec. 27, 2005

(54) SYSTEM MANAGEMENT MEMORY FOR SYSTEM MANAGEMENT INTERRUPT HANDLER INDEPENDENT OF BIOS AND OPERATING SYSTEM

(75) Inventor: Andrew W. Martwick, Folsom, CA (US)

(73) Assignee: Intel Corporation, Santa Clara, CA (US)

( * ) Notice: This patent is subject to a terminal disclaimer.

(21) Appl. No.: 10/742,693

(22) Filed: Dec. 19, 2003

Related U.S. Patent Documents

Reissue of:
(64) Patent No.: 6,418,498
Issued: Jul. 9, 2002
Appl. No.: 09/475,726
Filed: Dec. 30, 1999

(51) Int. Cl.[7] ..... G06F 9/48
(52) U.S. Cl. ..... 710/269
(58) Field of Search ..... 710/260, 261, 710/267, 269

(56) References Cited

U.S. PATENT DOCUMENTS 5,263,168 A * 11/1993 Toms et al. ..... 713/1
5,307,482 A * 4/1994 Bealkowski et al. ..... 714/30
5,896,534 A * 4/1999 Pearce et al. ..... 710/17
5,954,812 A * 9/1999 Shiell et al. ..... 712/39
6,145,048 A * 11/2000 Klein ..... 710/264
6,463,492 B1 * 10/2002 Engfer et al. ..... 710/260

FOREIGN PATENT DOCUMENTS

DE 2136762 * 7/1971 ..... G06F/9/18
EP 0 617 367 A2 * 9/1994 ..... G06F/13/24

* cited by examiner

*Primary Examiner*—Glenn A. Auve
(74) *Attorney, Agent, or Firm*—Jeffrey B. Huter

(57) ABSTRACT

A memory controller with an integrated system management memory region is disclosed. The memory controller receives an SMI acknowledge signal from a processor. The processor then delivers a system management memory address to the memory controller. Instead of fetching SMI handler instructions from the address indicated by the processor, the memory controller instead fetches SMI handler instructions from its integrated system management memory region. At the end of the integrated system management memory's SMI handler, the processor is instructed to fetch instructions from the address originally specified by the processor. In this manner, a BIOS SMI routine may be executed after the integrated SMI routine is executed.

34 Claims, 3 Drawing Sheets

SYSTEM MANAGEMENT MEMORY FOR SYSTEM MANAGEMENT INTERRUPT HANDLER INDEPENDENT OF BIOS AND OPERATING SYSTEM

Matter enclosed in heavy brackets [ ] appears in the original patent but forms no part of this reissue specification; matter printed in italics indicates the additions made by reissue.

FIELD OF THE INVENTION

The present invention pertains to the field of computer systems. More particularly, this invention pertains to the field of integrating a system management memory into a memory controller for a system management interrupt handler that is independent of both BIOS and operating system.

BACKGROUND OF THE INVENTION

A large majority of today's personal computer systems implement a system management interrupt (SMI). An SMI signal is asserted to a processor to alert the processor that an SMI event has occurred. The SMI signal is typically asserted to the processor by a system logic device that includes a memory controller. The system logic device may assert the SMI signal for any of a large number of possible reasons. For example, the SMI signal may be asserted if a system resource seeks access to a certain range of memory or to a particular input/output address. These memory and input/output addresses can be programmable via a set of registers that typically reside in the system logic device. The SMI signal may also be asserted if certain system events occur. For example, a computer system may be implemented with a variety of timers for timing a variety of system events. The SMI signal may be asserted if any of these timers expire.

An assertion of the SMI signal indicates to the processor that the processor should begin to fetch instructions from an address stored in one of the processor's registers. This register is sometimes referred to as the system management memory base address register. The memory space located at the address indicated by the system management memory base address register may be referred to as system management memory (SMM). The SMM has stored therein an SMI handler routine. The SMI handler may be implemented to perform any of a wide variety of functions. For example, the SMI handler may perform power management functions, or may try to correct system malfunctions.

The SMM, and therefore the SMI handler, is under control of the computer system's Basic Input/Output System (BIOS). The BIOS is typically designed and implemented by one of several BIOS software companies. The SMI handler is typically installed in the computer system during the system manufacturing process.

Often, there is a need to make changes to the SMI handler after the manufacturing process. One such situation can occur when a chipset manufacturer desires to provide a solution for an erratum or desires to either enable new features or disable old features. These desires can be met by altering the SMI handler. However, a chipset manufacturer's product may be utilized in computer systems built by dozens of different computer system manufacturers. Further, these system manufacturers typically use any of a number of BIOS software companies to design and implement the SMI handler. Therefore, if the chipset manufacturer needs to have the SMI handlers modified, it must negotiate with many different parties to have the changes made. The chipset manufacturer may also try to negotiate with operating system vendors to have the operating systems implement the chipset manufacturer's requests. Neither of these alternatives is desirable, in large part to the large amount of time and effort required to perform the negotiations and to implement the chipset manufacture's requests.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

An embodiment of a memory controller with an integrated system management memory region will be described. The memory controller receives an SML acknowledge signal from a processor. The processor then delivers a system management memory address to the memory controller. Instead of fetching SMI handler instructions from the address indicated by the processor, the memory controller instead fetches SMI handler instructions from its integrated system management memory region. At the end of the integrated system management memory's SMI handler, the processor is instructed to fetch instructions from the address originally specified by the processor. In this manner, a BIOS SMI routine may be executed after the integrated SMI routine is executed. The integrated system management memory region allows chipset or other system component manufacturers to distribute proprietary SMI routines without the need to involve BIOS or operating system vendors. The proprietary SMI routines may be utilized for any purpose that can be accomplished via a software routine, including, but not limited to, providing solutions for errata or enabling or disabling system or chipset features.

Figure 1:
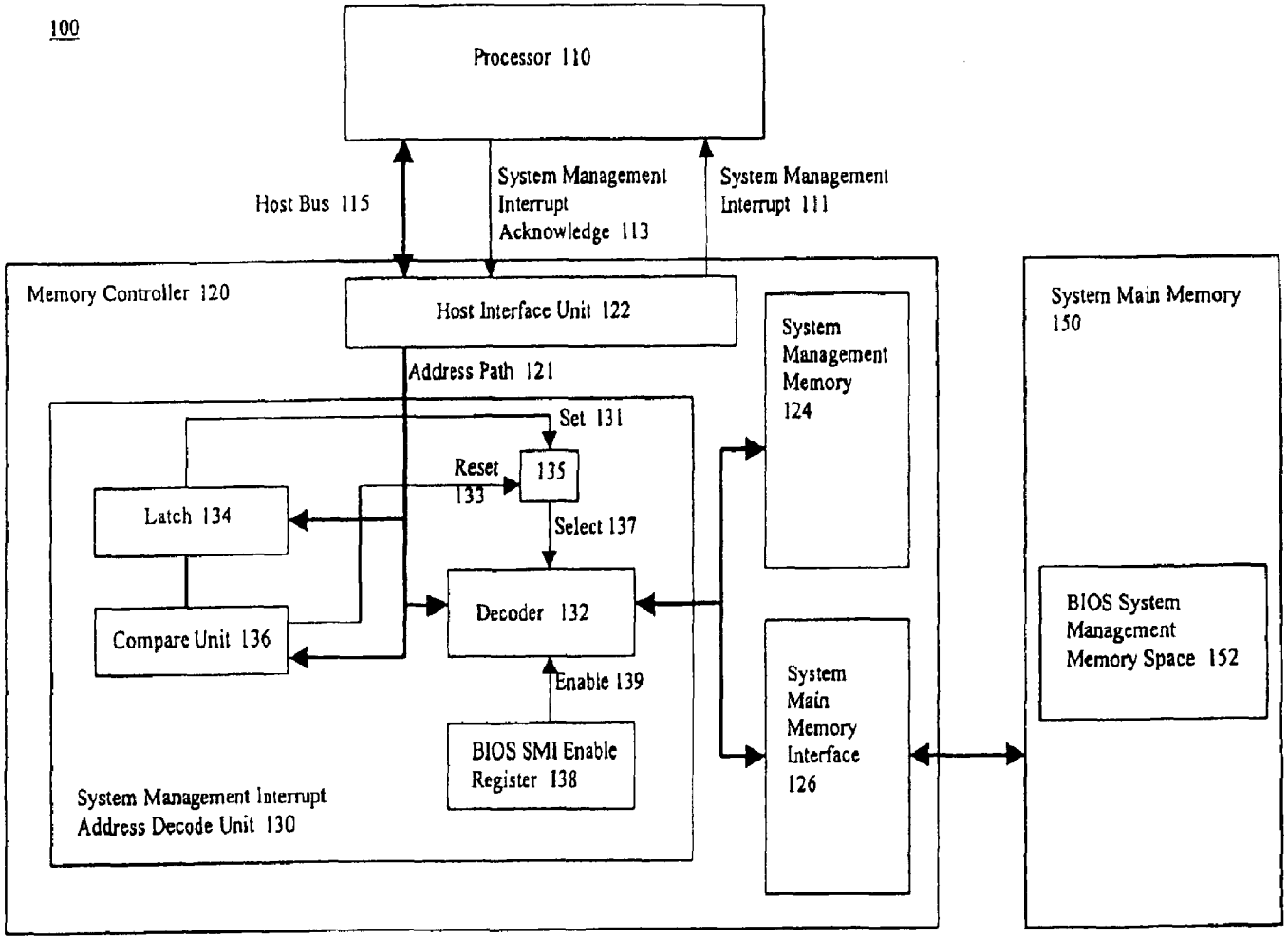
FIG. 1 is a block diagram of a computer system including one embodiment of a memory controller implemented in accordance with the invention.

FIG. 1 is a block diagram of a computer system 100 that includes a processor 110 coupled to a memory controller 120. The system 100 also includes a system main memory 150 that is also coupled to the memory controller 120.

The memory controller 120 includes a host interface unit 122 that facilitates communication with the processor 110. When an SMI event occurs, the host unit asserts a system management interrupt signal 111 to the processor 110. Systems may be implemented with a wide variety of SMI events, including, but not limited to, power management functions and accesses to particular regions of memory. The term "SMI event" as used herein is meant to indicate a broad range of computer system activities that computer system designers may wish to implement as activities that trigger the execution of a system management interrupt handler routine.

After the processor 110 receives the system management interrupt signal 111, the processor returns a system management interrupt acknowledge signal 113 to the memory controller 120. The processor 110 also delivers a fetch address to the memory controller via a host bus 115. The fetch address delivered by the processor 110 corresponds to an address stored in a system management memory base address register in the processor (not shown). The address stored in the system management memory base address register indicates where in memory space BIOS system management memory resides.

The fetch address delivered by the processor 110 over the host bus 115 is latched by a latch 134 that is located in a system management interrupt address decode unit 130. The fetch address is delivered to the latch 134 via an address path 121 that couples the host unit 122 with other units in the memory controller 120. Once the fetch address is latched in the latch 134, a set signal 131 is delivered to a flip-flop 135. The set signal 131 causes an select signal 137 to be asserted. The select signal 137 indicates to a decoder 132 to fetch the SMI handler routine from a system management memory 124 that is integrated into the memory controller 120. The decoder fetches SMI handler instructions from the system management memory 124, and the instructions are delivered to the processor 110. The processor 110 executes the delivered SMI handler instructions.

The SMI handler routine stored in the system management memory 124 includes at the conclusion of the routine an instruction that tells the processor 110 to jump to the address stored in the latch 134. A compare unit 136 receives addresses delivered by the processor 110 to the host interface unit 122 over the address path 121. The compare unit 136 compares the received addresses with the contents of the latch 134. A match between a newly received address and the contents of the latch 134 indicates that the SMI routine stored in the system management memory 124 has been completely executed and that the processor 110 is now attempting to access the SMI routine stored at the address originally specified in the processor's system management memory base address register. When a match is found, the compare unit 136 delivers a reset signal 133 to the flip-flop 135. The reset signal 133 results in the selected signal 137 being deasserted. The decoder 132 will then fetch instructions from the SMM space pointed to by the matched address.

The SMM space originally pointed to by the address stored in the processor's system management memory base address register may reside in a BIOS system management memory space 152 that is located in the system main memory 150. The decoder 132 accesses the BIOS system management memory space 152 via a system main memory interface 126.

The status of a BIOS SMI enable register 138 determines whether the SMI routine stored in BIOS system management memory space 152 will be executed following the execution of the SMI routine stored in the system management memory 124. The BIOS SMI enable register 138 communicates its status to the decoder 132 via an enable signal 139.

Another embodiment of the memory controller 130 may include an enable register that when cleared would prevent the integrated SMI routine from executing. Setting this register would allow the integrated SMI handler routine to execute as described above.

Figure 2:
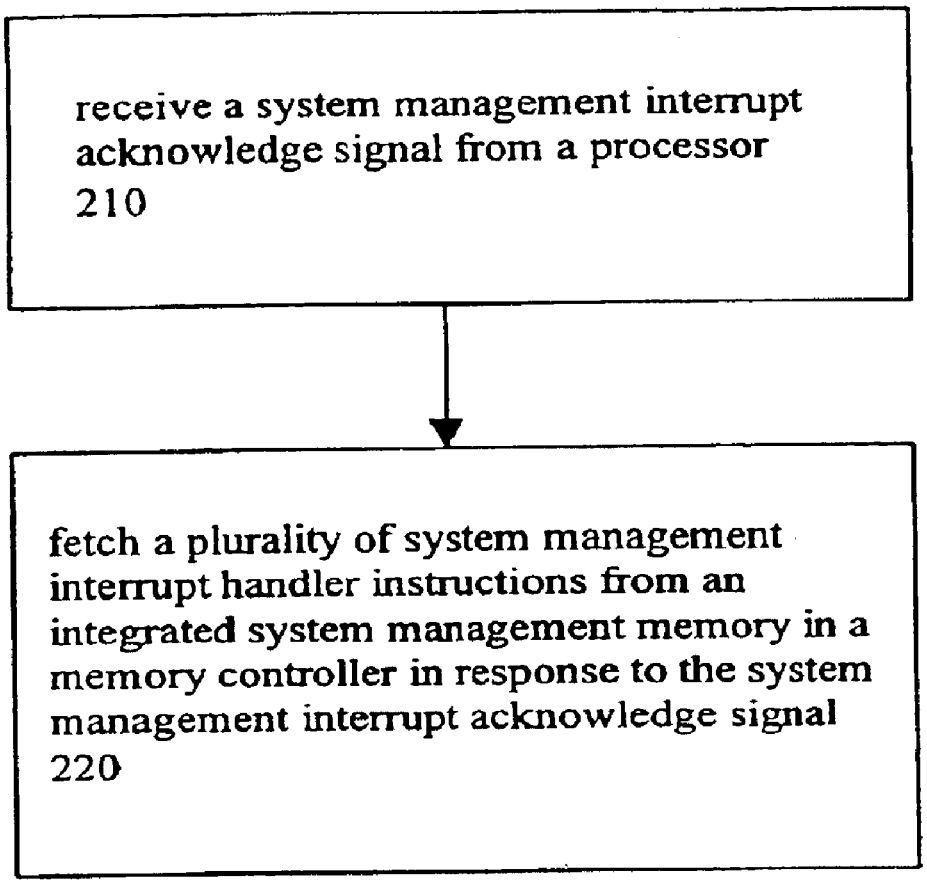
FIG. 2 is a flow diagram of an embodiment of a method for utilizing an integrated system management memory region.

FIG. 2 is a flow diagram of a method for executing an SMI handler routine stored in an integrated system management memory. At step 210, a system management interrupt acknowledge signal is received from a processor. At step 220, system management interrupt handler instructions are fetched from a system management memory integrated into a memory controller. The instruction fetch from the integrated system management memory is in response to the receipt of the system management interrupt acknowledge signal at step 210.

Figure 3:
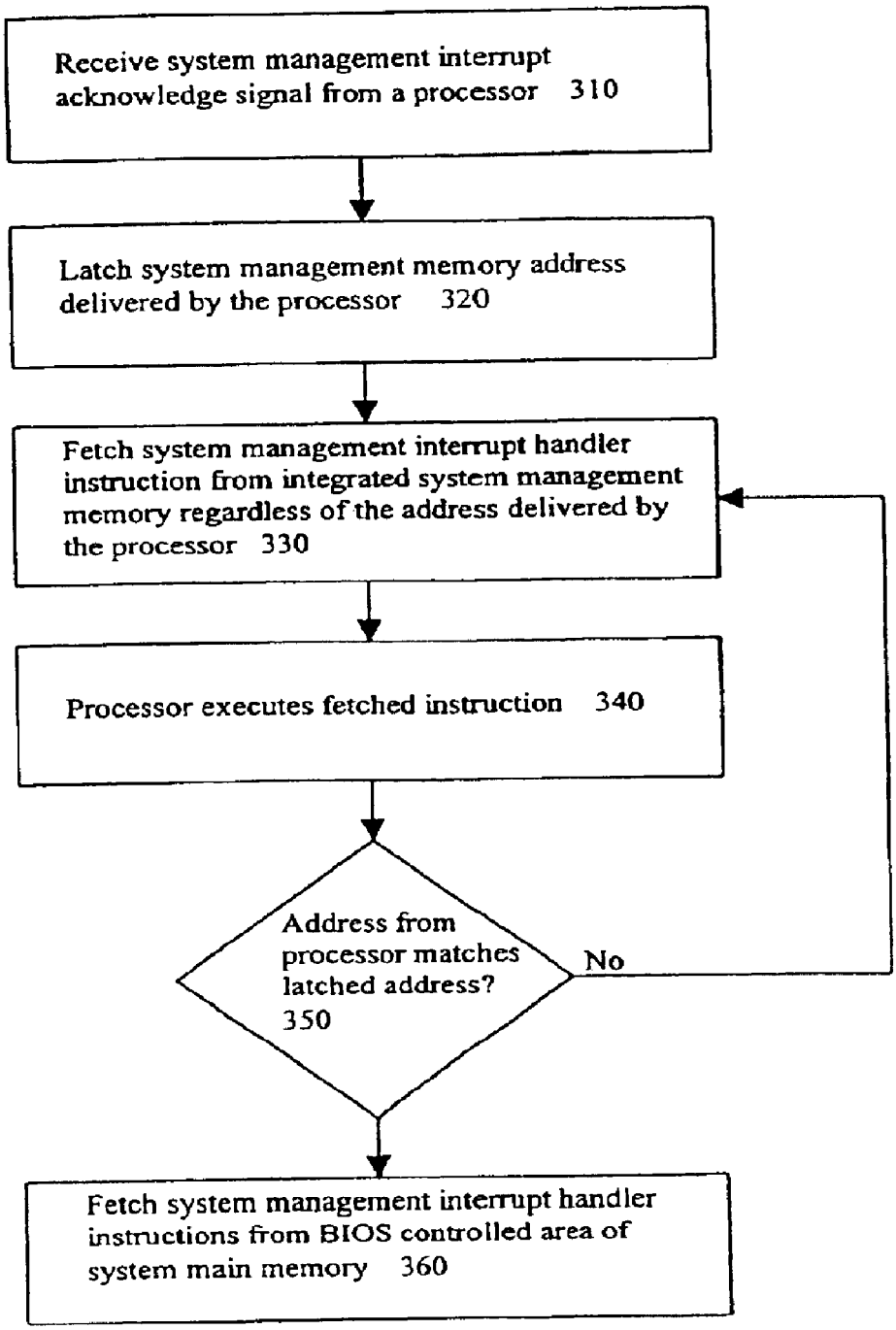
FIG. 3 is a flow diagram of an embodiment of an additional method for utilizing a system management memory integrated into a memory controller.

FIG. 3 is a flow diagram of an additional embodiment of a method for executing an SMI handler stored in a system management memory integrated into a memory controller. At step 310, a system management interrupt acknowledge signal is received from a processor. Following step 310, a system management memory address delivered by the processor is latched at step 320. A system management interrupt handler instruction is then fetched from an integrated system management memory at step 330. The fetch is from the integrated memory regardless of what address was specified by the processor. At step 340 the processor executes the fetched instruction.

At step 350 a compare operation is performed to determine whether an address newly delivered by the processor matches the address previously latched at step 320. If the addresses do not match, then the process flow returns to step 330. If, however, the addresses do match, then at step 360 a system management interrupt handler is fetched from a BIOS controlled area of system memory.

Although the example embodiments described above discuss the system management memory regions as being integrated into a memory controller, other embodiments are possible with the system management memory region located elsewhere. Having a system management memory region that is physically separate from the BIOS controlled system management memory region and also separate from system main memory has a benefit in that neither the BIOS nor any other operating system or program can inadvertently overwrite the system management memory.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

What is claimed is:

1. An apparatus, comprising:

an integrated system management memory region; and a system management interrupt address decode unit to fetch instructions from the integrated system management memory region in response to a system management interrupt acknowledge signal asserted by a processor, the system management interrupt decode unit to fetch instructions from the integrated system management memory region regardless of a system management interrupt address received from the processor.

2. The apparatus of claim 1, the system management interrupt address decode unit to latch the system management interrupt address received from the processor.

3. The apparatus of claim 2, wherein the system management interrupt address is the first address received following the assertion of the system management interrupt acknowledge signal by the processor.

4. The apparatus of claim 3, wherein the system management interrupt address decode unit includes a compare unit to compare a plurality of addresses received from the processor with the latched system management interrupt address.

5. The apparatus of claim 4, the system management interrupt address decode unit to fetch system management interrupt handler instructions stored in a system main memory in response to the compare unit finding a match between the latched system management interrupt address and one of the plurality of addresses received from the processor.

6. The apparatus of claim 5, wherein the system management interrupt handler instructions stored in the system main memory are part of a basis input/output system (BIOS).

7. The apparatus of claim 6, wherein the integrated system management memory region is at least 128 bytes in size.

8. A method, comprising:

receiving a system management interrupt acknowledge signal from a processor; and fetching a plurality of system management interrupt handler instructions from an integrated system management memory in a memory controller regardless of a system management memory address indicated by the processor in response to the system management interrupt acknowledge signal.

9. The method of claim 8, further comprising latching the system management memory address indicated by the processor.

10. The method of claim 9, wherein latching the system management memory address includes latching a first address delivered by the processor following receiving the system management interrupt acknowledge signal.

11. The method of claim 10, further comprising comparing a plurality of addresses received form the processor with the latched address.

12. The method of claim 11, further comprising fetching a plurality of system management interrupt handler instructions from a section of BIOS code in a system main memory if comparing a plurality of addresses received from the processor with the latched address results in a match.

13. A system, comprising:

a processor;

a system main memory; and a memory controller coupled between the processor and the system main memory, the memory controller including an integrated system management memory region, and a system management interrupt address decode unit to fetch instructions from the integrated system management memory region in response to a system management interrupt acknowledge signal asserted by the processor, the system management interrupt decode unit to fetch instructions from the integrated system management memory region regardless of a system management interrupt address received from the processor.

14. The system of claim 13, the system management interrupt address decode unit to latch the system management interrupt address received from the processor.

15. The system of claim 14, wherein the system management interrupt address is the first address received by the memory controller following the assertion of the system management interrupt acknowledge signal by the processor.

16. The system of claim 15, wherein the system management interrupt address decode unit includes a compare unit to compare a plurality of addresses received from the processor with the latched system management interrupt address.

17. The system of claim 16, the system management interrupt address decode unit to fetch system management interrupt handler instructions stored in the system main memory in response to the compare unit finding a match between the latched system management interrupt address and one of the plurality of addresses received from the processor.

18. The system of claim 17, wherein the system management interrupt handler instructions stored in the system main memory are part of a basis input/output system (BIOS).

19. The system of claim 18, wherein the integrated system management memory region is at least 128 bytes in size.

*20. An apparatus, comprising:*

*a system management memory; and*

*a system management interrupt address decode unit to fetch instructions from the system management memory in response to a system management interrupt acknowledge signal asserted by a processor, the system management interrupt decode unit to fetch instructions from the system management memory regardless of a system management interrupt address received from the processor.*

*21. The apparatus of claim 20, the system management interrupt address decode unit to latch the system management interrupt address received from the processor.*

*22. The apparatus of claim 21, wherein the system management interrupt address is the first address received following the assertion of the system management interrupt acknowledge signal by the processor.*

*23. The apparatus of claim 22, wherein the system management interrupt address decode unit includes a compare unit to compare a plurality of addresses received from the processor with the latched system management interrupt address.*

*24. The apparatus of claim 23, wherein the system management interrupt address decode unit fetches system management interrupt handler instructions stored in a system main memory in response to the compare unit finding a match between the latched system management interrupt address and one of the plurality of addresses received from the processor.*

*25. The apparatus of claim 24, wherein the system management interrupt handler instructions stored in the system main memory are part of a basic input/output system (BIOS).*

*26. A method, comprising:*

*receiving a system management interrupt acknowledge signal from a processor; and*

*in response to the system management interrupt acknowledge signal, fetching a plurality of system management interrupt handler instructions from a system management memory instead fetching a plurality of system management interrupt handler instructions of a basic input/output system (BIOS) identified by a system management memory address regardless of the system management memory address indicated by the processor.*

*27. The method of claim 26, further comprising latching the system management memory address indicated by the processor.*

*28. The method of claim 27, further comprising*

*comparing a plurality of addresses received from the processor with the latched address, and*

*fetching a plurality of system management interrupt handler instructions from the BIOS in response to the latched address matching an address of the a plurality of addresses received from the processor.*

*29. The method of claim 26, further comprising fetching a plurality of system management interrupt handler instructions from the BIOS in response to the system management memory address matching an address of another system management memory address previously received from the processor.*

*30. A system, comprising:*

*a processor;*

*a system management memory,*

*a basic input/output system, and*

*a system management interrupt address decode unit to fetch instructions from the system management memory in response to a system management interrupt acknowledge signal asserted by the processor, the system management interrupt address decode unit to fetch instructions from the system management memory instead of fetching instructions of the basic input/output system identified by a system management interrupt address regardless of a system management interrupt address received from the processor.*

*31. The system of claim 30, the system management interrupt address decode unit to latch the system management interrupt address received from the processor.*

*32. The system of claim 31, wherein the system management interrupt address is the first received address received by the system management interrupt decode unit following the assertion of the system management interrupt acknowledge signal by the processor.*

*33. The system of claim 32, wherein the system management interrupt address decode unit includes a compare unit to compare a plurality of addresses received from the processor with the latched system management interrupt address.*

*34. The system of claim 33, wherein the system management interrupt address decode unit fetches system management interrupt handler instructions of the BIOS in response to the compare unit finding a match between the latched system management interrupt address and one of the plurality of addresses received from the processor.*

* * * * *